Feb. 1, 1927. 1,615,844
J. KNAPP
DISHWASHING MACHINE
Filed Jan. 29, 1923  2 Sheets-Sheet 1

J. Knapp,
Inventor.
By C.A. Snow & Co.
Attorneys

Feb. 1, 1927. 1,615,844
J. KNAPP
DISHWASHING MACHINE
Filed Jan. 29, 1923 2 Sheets-Sheet 2
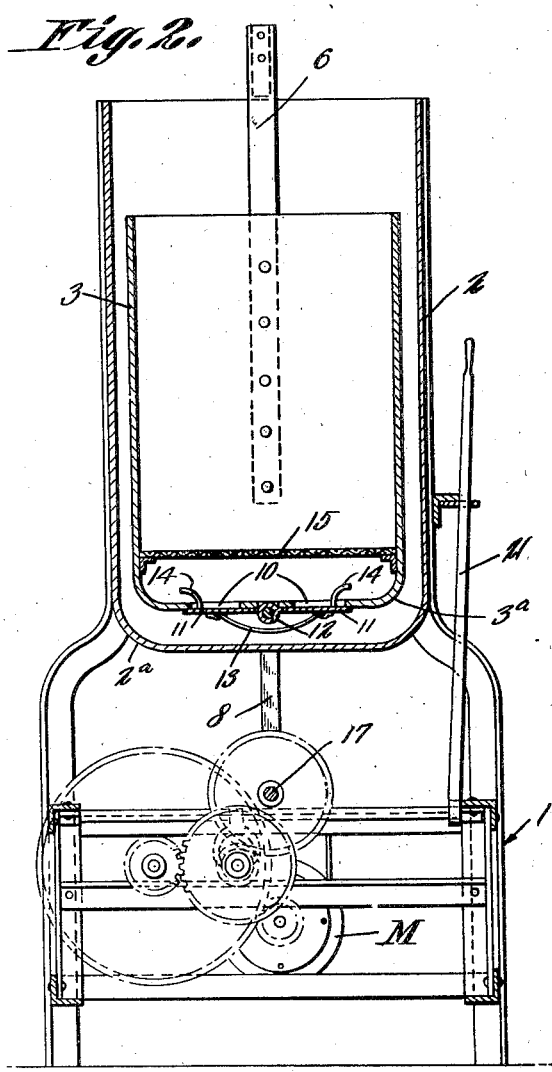
Fig. 2.
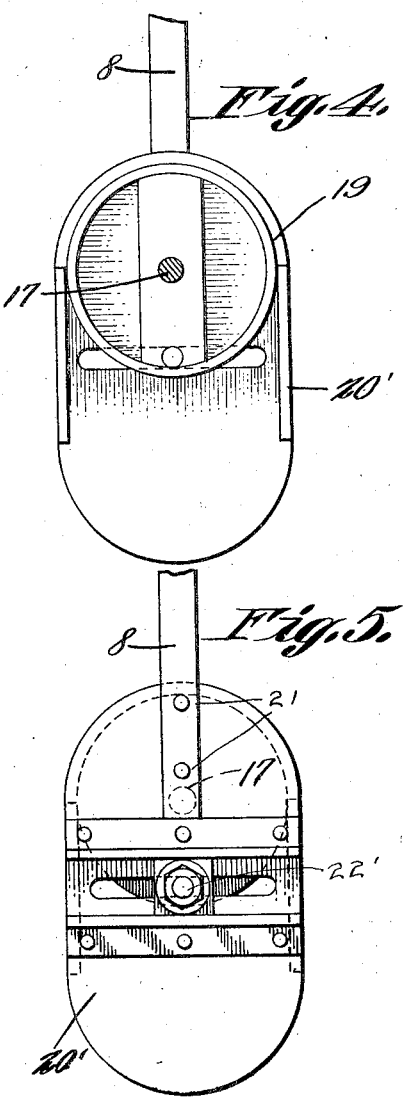
Fig. 4.
Fig. 5.
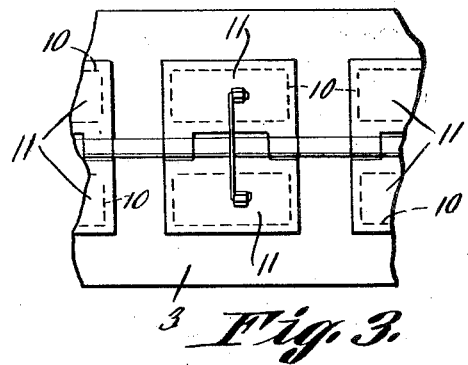
Fig. 3.
J. Knapp,
Inventor.
By C. A. Snow & Co.
Attorneys.

Patented Feb. 1, 1927.

1,615,844

UNITED STATES PATENT OFFICE.

JOSEPH KNAPP, OF KAUFMAN, TEXAS.

DISHWASHING MACHINE.

Application filed January 29, 1923. Serial No. 615,697.

This invention relates to culinary utensils and more particularly to dish washing machines.

The object of the invention is to provide a dish washing machine which while comparatively simple in construction and easily operated, will effectively wash the dishes, cleansing them of all particles of food.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Fig. 2 is a transverse section thereof taken on the line 2—2 of Fig. 1.

Fig. 3 is a detail bottom plan view of the dish container.

Fig. 4 is a detail vertical section taken on the line 4—4 of Fig. 1, and

Fig. 5 is an end elevation thereof.

Figure 1:
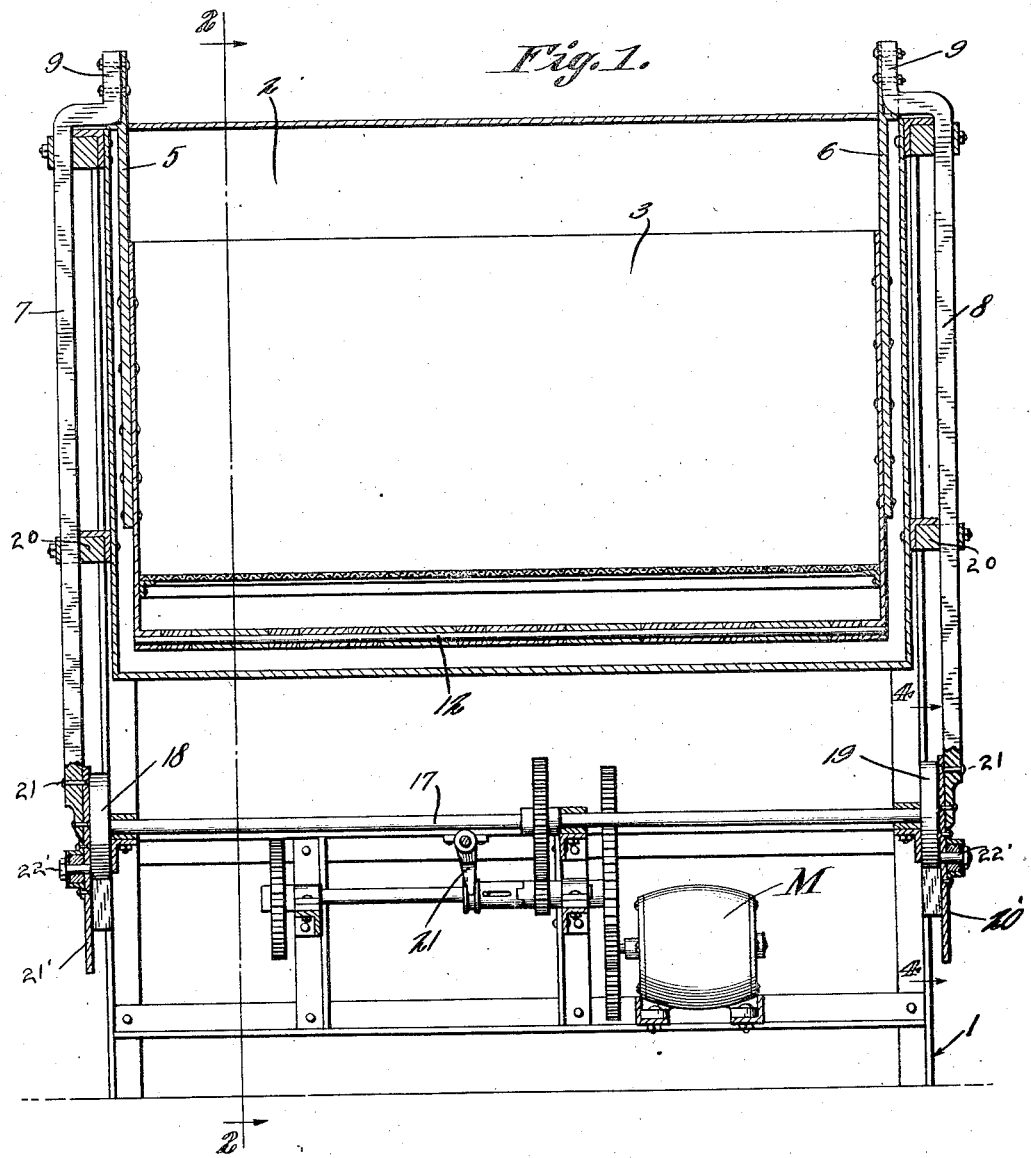
Figure 1 represents a longitudinal vertical section of a machine constructed in accordance with this invention.

In the embodiment illustrated, the machine 1 constituting this invention includes a supporting frame which is here shown constructed of angle iron, although obviously it may be made of any other suitable material. In the upper portion of this frame 1 is fixedly mounted a tank 2 having a dish receiving container 3 mounted therein and spaced therefrom to provide a suitable clearance around the sides, ends, top and bottom. The tank 2 and container 3 have their lower corners rounded as shown at 2ª and 3ª.

Hangers 5 and 6 are secured to the ends of the container 3 and project above the top thereof and are bolted to the upper ends of rods 7 and 8 which have their inner ends offset inwardly as shown at 9, the ends 9 being bolted to the hangers as is shown clearly in Fig. 1.

The container 3 is provided in its bottom with a plurality of spaced openings 10, said openings being preferably arranged in series along opposite sides of the center of the container bottom, and a rod 12 is mounted in the space between the series and operates as a pintle for hinging flap valves 11 which are designed to close the openings 10 at certain intervals as will be hereinafter more fully described. These valves 11 are yieldably held in closed position by springs 13 shown clearly in Fig. 2, and each of the valves has a hook-shaped stop 14 arranged adjacent its free edge and extending into the container, being designed to engage the bottom thereof when the valve is opened to a predetermined point to avoid the valves being opened too wide.

A foraminous false bottom 15 is mounted in the container 3 at a point spaced above the bottom thereof and on which the dishes to be washed are designed to rest.

Suitable mechanism is connected with the rods 7 and 8 to reciprocate the container 3 up and down within the tank 2 and as shown, this machinery consists of a one-fourth horse power motor M supported in the frame 1 below the tank 2 and which is suitably geared to a shaft 17 which extends the full length of the machine as is shown clearly in Fig. 1 and is provided at its opposite ends with wheels 18 and 19 having a four inch throw. The connecting rods 7 and 8 are eccentrically connected to the elongated plates 20' and 21' at 21, which plates are provided with elongated openings for the reception of the bolts 22' that are eccentrically mounted on the wheels 18 and 19 so that a true vertical movement of the rods 7 and 8 will be permitted, as the wheels 18 and 19 are rotated. These rods 7 and 8 operate through guides 20 on the ends of the machine and as above stated, are bolted at their upper ends to the hangers 5 and 6 of the container 3. The gearing which connects shaft 17 with the motor M is designed for reducing the speed of the motor down to the proper speed for the container 3.

A lever 21 is connected with the operating mechanism for starting and stopping the machine.

In the use of this machine, the dishes or materials to be washed are placed inside the container 3 on the screen or false bottom 15 and water sufficient to fill all dead space between the tank and container plus the amount which the stroke of the container displaces is supplied. After the dishes and water have been supplied as above stated, the motor is started and the container 3 thereby reciprocated. When the container descends, the valves 11 in the bottom thereof are closed and it displaces an amount of water in the tank 2 equal to the area of the cross section of the container employed by the length of the stroke. This water rises in the clearance space between the tank and container and flows over the top of the container and is carried down through or beneath the dishes contained therein and as the container makes its upward stroke, the flap valves in the bottom thereof open and allow the water to drain into the tank, which completes the cycle.

It will thus be seen that this forcing of the water through the container on the up and down strokes thereof, will thoroughly cleanse the contents of the tank, and after being so cleansed, the dishes or other articles may be removed and dried or not, as desired.

While the container 3 and tank 2 are shown substantially rectangular in form, it is of course understood that they may be constructed of other desired configuration and any suitable power may be employed for operating the container.

In the apparatus shown, the container has a travel of four inches and a speed of thirty strokes per minute, which of course is variable to suit conditions.

I claim:—

1. In a dishwashing machine, a frame, a tank supported by the frame, a vertically movable container operating within the tank, said container having openings in the bottom thereof, hinged valves for guarding the openings, means for limiting the movements of the valves upon one movement of the container, and means for normally closing the valves.

2. In a dishwashing machine, a frame, a tank supported by the frame, a vertically movable container operating within the tank, said container having openings in the bottom thereof, hinged valves for guarding the openings, curved stops extending into the container, and adapted to engage the bottom of the container adjacent to the opening, to limit movement of the valve, and false bottom above the opening to support material in spaced relation with the openings.

In testimony that I claim the foregoing as my own, I have hereto affixed my signature.

JOSEPH KNAPP.